(12) United States Patent
Lee

(10) Patent No.: US 9,398,432 B2
(45) Date of Patent: Jul. 19, 2016

(54) ELECTRONIC DEVICE AND METHOD FOR CONTROLLING EMERGENCY CALL IN ELECTRONIC DEVICE

(71) Applicant: Samsung Electronics Co., Ltd., Gyeonggi-do (KR)

(72) Inventor: Seung-Hyun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/622,602

(22) Filed: Feb. 13, 2015

(65) Prior Publication Data

US 2016/0021521 A1 Jan. 21, 2016

(30) Foreign Application Priority Data

Jul. 17, 2014 (KR) .......................... 10-2014-0090337

(51) Int. Cl.
*H04W 4/22* (2009.01)
*H04W 88/06* (2009.01)

(52) U.S. Cl.
CPC ................ *H04W 4/22* (2013.01); *H04W 88/06* (2013.01)

(58) Field of Classification Search
CPC ..... H04W 76/007; H04W 4/22; H04W 88/06; G08B 25/016; H04M 11/04; H04M 2242/04
See application file for complete search history.

(56) References Cited

U.S. PATENT DOCUMENTS

| 2010/0279648 | A1* | 11/2010 | Song | H04W 4/22 455/404.1 |
| 2011/0141979 | A1* | 6/2011 | Keller | H04W 36/0022 370/328 |
| 2015/0281929 | A1* | 10/2015 | Shih | H04W 4/22 455/404.1 |

FOREIGN PATENT DOCUMENTS

KR 10-2012-0080229 7/2012

* cited by examiner

*Primary Examiner* — Ted Wang

(57) ABSTRACT

An electronic device includes a communication module configured to support a first communication network and a second communication network, comprising a switch module for switching between the first communication network and the second communication network, and a processor configured to determine whether at least one of conditions for switching to a second communication network is satisfied when a request for originating an emergency call is made in a state of a setting of providing a voice service through a first communication network, cause the switch module to switch into the second communication network, and attempt to originate the emergency call when the at least one of conditions for switching to the second communication network is satisfied. Other embodiments are implemented.

19 Claims, 9 Drawing Sheets

ELECTRONIC DEVICE AND METHOD FOR CONTROLLING EMERGENCY CALL IN ELECTRONIC DEVICE

CROSS-REFERENCE TO RELATED APPLICATION(S) AND CLAIM OF PRIORITY

The present application is related to and claims the priority under 35 U.S.C. §119(a) to Korean Application Serial No. 10-2014-0090337, which was filed in the Korean Intellectual Property Office on Jul. 17, 2014, the entire content of which is hereby incorporated by reference.

TECHNICAL FIELD

The present disclosure relates to an electronic device and a method for controlling an emergency call in the electronic device.

BACKGROUND

In an existing Long Term Evolution (LTE) scheme, only a data service uses an LTE network which is a Packet Switched (PS) network, and a voice service uses a Third Generation (3G) network which is a Circuit Switched (CS) network. However, in a recent LTE scheme, not only a data service but also a voice service may use the LTE network. Accordingly, an electronic device capable of providing a voice service through the LTE network may provide a voice telephony call of improved quality to a user.

SUMMARY

In accordance with an aspect of the present disclosure, an electronic device includes a communication module configured to support a first communication network and a second communication network, comprising a switch module for switching between the first communication network and the second communication network, a processor configured to determine whether at least one of conditions for switching to a second communication network satisfies a condition, when a request for originating an emergency call is made in a state of a setting for providing a voice service through a first communication network, cause the switch module to switch into the second communication network, and attempt to originate the emergency call when the at least one of conditions for switching to the second communication network is satisfied.

In accordance with another aspect of the present disclosure, a method for controlling an emergency call in an electronic device includes determining whether current information of the electronic device satisfies condition information for switching to a second communication network, when a request for originating an emergency call is made in a state of a setting of providing a voice service through a first communication network, and switching to the second communication network and attempting to originate the emergency call when one of conditions for switching to the second communication network is satisfied.

The electronic device and the method for controlling an emergency call in the electronic device, according to various embodiments of the present disclosure, may quickly perform an emergency call without waste of time while ensuring the safety and urgency of a telephone call.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
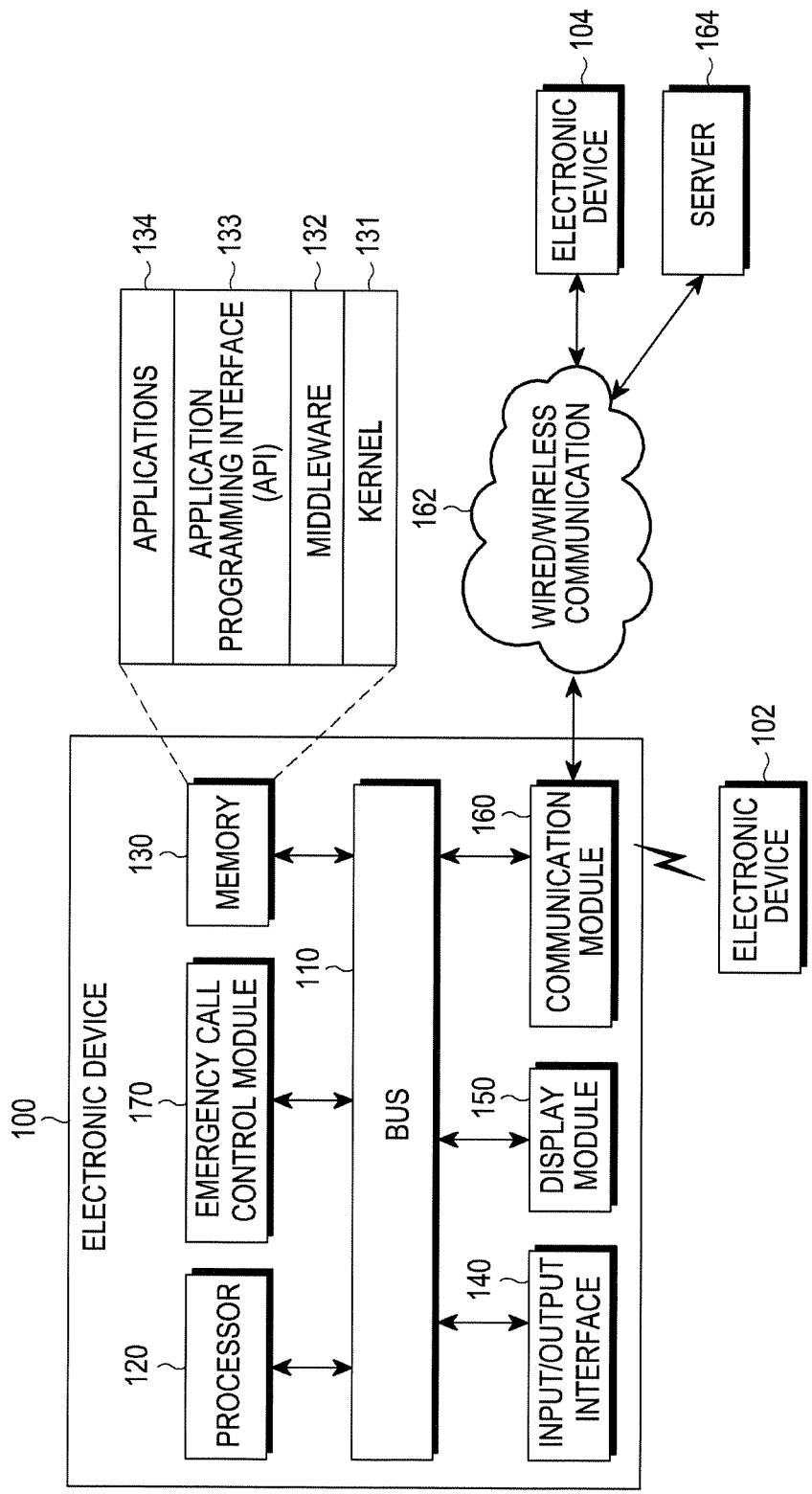
FIG. 1 is a block diagram illustrating a configuration of an electronic device according to various embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, embodiments of the present disclosure will be described with reference to the accompanying drawings. Although specific embodiments are illustrated in the drawings and related detailed descriptions are discussed in the present disclosure, the present disclosure may have various modifications and several embodiments. Accordingly, the present disclosure is not limited to a specific implementation form and it should be understood that the present disclosure includes all changes or equivalents and substitutes included in the spirit and scope of the present disclosure. In connection with descriptions of the drawings, similar components are designated by the same reference numeral. Further, a detailed description of a known function and configuration which may make the subject matter of the present disclosure unclear will be omitted. In the following description, it should be noted that only portions required for comprehension of operations according to the embodiments of the present disclosure will be described and descriptions of other portions will be omitted not to make subject matters of the present disclosure obscure.

The expressions such as "include" and "may include" which may be used in the present disclosure denote the presence of the disclosed functions, operations, and constituent elements and do not limit one or more additional functions, operations, and constituent elements. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In the present disclosure, the expression "or" includes any or all combinations of words enumerated together. For example, the expression "A or B" may include A, may include B, or may include both A and B. For example, the expression "A or B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, without departing from the scope of the present disclosure, a first structural element may be named a second structural element. Similarly, the second structural element also may be named the first structural element.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

In the present disclosure, the terms are used to describe a specific embodiment, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of the art, and are not to be interpreted to have ideal or excessively formal meanings unless clearly defined in the present disclosure.

An electronic device according to the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic accessory, an electronic tattoo, and a smart watch.

According to some embodiments, the electronic device may be a smart home appliance with a camera function. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic device may include at least one of various types of medical devices (for example, Magnetic Resonance Angiography (MRA), Magnetic Resonance Imaging (MRI), Computed Tomography (CT), a smayning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to an embodiment, an electronic device may include at least one of a part of furniture or a building/structure having a communication function, an electronic board, an electronic signature receiving device, a projector, and various types of measuring instruments (for example, a water meter, an electric meter, a gas meter, a radio wave meter, and the like). The electronic device according to the present disclosure may be a combination of one or more of the aforementioned various devices. Further, it is obvious to those skilled in the art that the electronic device according to the present disclosure is not limited to the aforementioned devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) that uses an electronic device.

An electronic device capable of providing a voice service through a PS network always attempts to originate an emergency call through the PS network without a particular condition when the origination of the emergency call is requested. First, when the origination of the emergency call is attempted through the PS network and then fails, the electronic device switches to a CS network, and attempts to originate the emergency call through the CS network.

When the origination of the emergency call is attempted in a region (e.g., a mountain, a part, etc.) where the PS network is insecure, or in a region (e.g., a stadium, a performance hall, etc.) where the traffic of the PS network is high, due to the failure of origination of the emergency call through the PS network, a process in which the electronic device switches from the PS network to the CS network and again attempts to originate an emergency call causes the waste of time, and may raise a possibility that the emergency call of which security must be ensured during a telephone call may be dropped.

When the setting of providing a voice service through the PS network is mayceled in order to attempt the origination of an emergency call through the CS network, an advantage (e.g., improvement in setup time, improvement in quality of a telephone call, etc.) in the case of providing the voice service through the PS network may not be used.

To address the above-discussed deficiencies, this disclosure provides an apparatus and a method which may quickly perform an emergency call without waste of time while ensuring the safety and urgency of a telephone call.

FIG. 1 is a block diagram illustrating a configuration of an electronic device according to various embodiments of the present disclosure. Referring to FIG. 1, the electronic device 100 may include a bus 110, a processor 120, a memory 130, an input/output interface 140, a display module 150, and a communication module 160, or an emergency call control module 170.

The bus 110 may be a circuit that interconnects the above-described elements and delivers communications (e.g., a control message) between the above-described elements.

The processor 120 may receive commands from the above-described other elements (e.g., the memory 130, the input/output interface 140, the display module 150, the communication module 160, etc.) through the bus 110, may interpret the received commands, and may execute calculation or data processing according to the interpreted commands.

The memory 130 may store commands or data received from the processor 120 or other elements (e.g., the input/output interface 140, the display module 150, the communication module 160, etc.) or generated by the processor 120 or other elements. The memory 130 may include programming modules, such as a kernel 131, middleware 132, an Application Programming Interface (API) 133, at least one application 134, and the like. Each of the above-described programming modules may be implemented in software, firmware, hardware, or a combination of two or more thereof.

The kernel 131 may control or manage system resources (e.g., the bus 110, the processor 120, the memory 130, etc.) used to execute operations or functions implemented by the remaining other programming modules (e.g., the middleware 132, the API 133, and the application 134). Also, the kernel 131 may provide an interface, through which the middleware 132, the API 133, or the application 134 may access and may control or manage individual elements of the electronic device 100.

The middleware 132 may serve as a go-between so as to enable the API 133 or the application 134 to communicate with the kernel 131 before exchanging data with the kernel 131. Also, in relation to work requests received from the multiple applications 134, the middleware 132 may perform load balancing for the work requests by using, for example, a method for assigning a priority, in which the system resources (e.g., the bus 110, the processor 120, the memory 130, etc.) of the electronic device 100 are capable of being used, to at least one of the multiple applications 134.

The API 133 is an interface which enables the application 134 to control a function provided by the kernel 131 or the middleware 132, and may include at least one interface or function for, for example, file control, window control, image processing, character control, or the like.

The input/output interface 140, for example, may receive a command or data as input from a user, and may deliver the received command or data to the processor 120 or the memory 130 through the bus 110. The display module 150 may display, to the user, a video, an image, data (e.g., multimedia data, text data, or the like), or the like.

The communication module 160 may connect communication between other electronic devices 102 and 104 or a server 164 and the electronic device 100. The communication module 160 may support wired/wireless communication 162, such as predetermined short-range wired/wireless communication (e.g., Wi-fi, Bluetooth (BT), and Near Field Communication (NFC)), predetermined network communication (e.g., the Internet, a Local Area Network (LAN), a Wide Area Network (WAN), a telecommunication network, a cellular network, a satellite network, Universal Serial Bus (USB), Recommended Standard 232 (RS-232), Plain Old Telephone Service (POTS), etc.), and the like. Each of the electronic devices 102 and 104 may be a device which is identical (e.g., of an identical type) to or different (e.g., of a different type) from the electronic device 100.

When the origination of an emergency call is requested in a state of a setting of providing a voice service through a first communication network, the emergency call control module 170 may switch to a second communication network according to a condition, and may attempt to originate the emergency call. Additional information on the emergency call control module 170 is provided as illustrated in FIG. 2 to FIG. 8 below.

Figure 2:
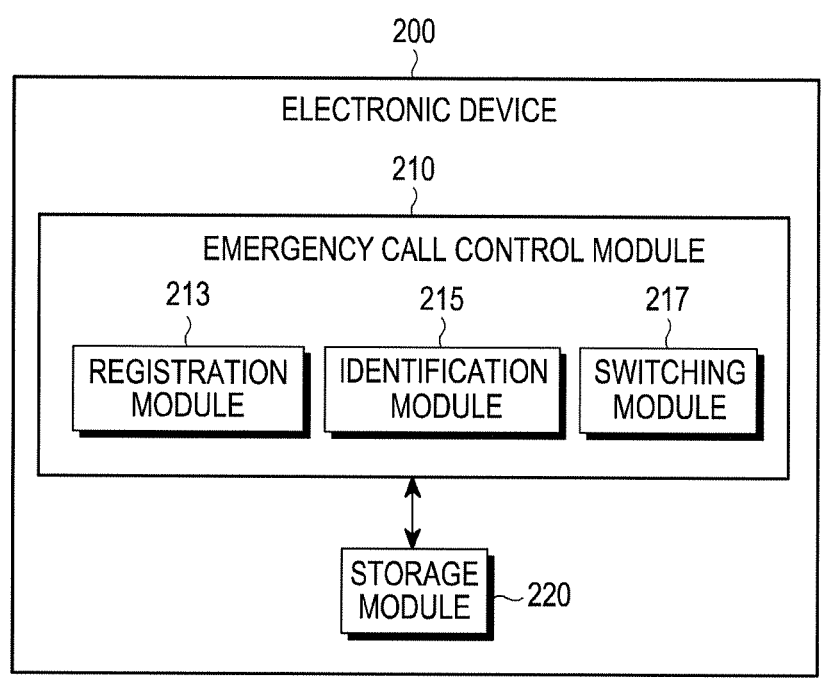
FIG. 2 is a block diagram illustrating a configuration of an electronic device for controlling an emergency call according to various embodiments of the present disclosure.

FIG. 2 is a block diagram illustrating a configuration of an electronic device 200 for originating an emergency call according to various embodiments of the present disclosure. The electronic device 200 may be, for example, the electronic device 100 illustrated in FIG. 1. Referring to FIG. 2, the electronic device 200 may include an emergency call control module 210 and a storage module 220. In some embodiments, the emergency call control module 210 including its sub modules may be incorporated into the processor 120.

According to an embodiment of the present disclosure, the emergency call control module 210 may include a registration module 213, an identification module 215, and a switching module 217. According to an embodiment of the present disclosure, the emergency call control module 210 may be the emergency call control module 170 illustrated in FIG. 1. According to an embodiment of the present disclosure, the emergency call control module 210 may be the processor 120 illustrated in FIG. 1. The emergency call control module 210 may include one of or a combination of two or more of, for example, hardware, software and firmware.

According to an embodiment of the present disclosure, the registration module 213 may register a designated condition compared with at least one of conditions for switching to a second communication network in order to originate an emergency call. According to an embodiment of the present disclosure, in a location information registration mode for switching to the second communication network in order to originate an emergency call, the registration module 213 may store, in the storage module 220, at least one piece of location information that the user inputs through a user interface, as location information for switching to the second communication network in order to originate the emergency call. In the location information registration mode for switching to the second communication network in order to originate the emergency call, when the user inputs a time zone through the user interface, the registration module 213 may store, in the storage module 220, the time zone that the user has input, as time information for attempting to originate an emergency call through the second communication network. The registration module 213 may automatically store, in the storage module 220, location information of a location, at which the number of failures of connecting a voice service through a first communication network is greater than or equal to the predetermined number of times, as the location information for switching to the second communication network in order to originate the emergency call. The registration module 213 may display a message recommending the user to store the location information of the location, at which the number of failures of connecting a voice service through the first communication network is greater than or equal to the predetermined number of times, as the location information for switching to the second communication network in order to originate the emergency call.

According to an embodiment of the present disclosure, in a function registration mode for switching to the second communication network in order to originate an emergency call, when the user sets switching to the second communication network in order to originate the emergency call through the user interface, if the electronic device 200 originates the emergency call, the registration module 213 may register a function capable of automatically switching to the second communication network.

According to an embodiment of the present disclosure, in a lock pattern registration mode for switching to the second communication network in order to originate an emergency call, the registration module 213 may store, in the storage module 220, a pattern that the user inputs through the user interface, as pattern information for originating an emergency call in a lock-screen state.

According to an embodiment of the present disclosure, in a particular gesture registration mode for switching to the second communication network in order to originate an emergency call, the registration module 213 may store, in the storage module 220, a gesture received by a camera module, as particular gesture information for switching to the second communication network in order to originate the emergency call. For example, a gesture image may be variously set to a facial expression, a hand shape, and the like.

According to an embodiment of the present disclosure, in a biometric registration mode for switching to the second communication network in order to originate an emergency call, the registration module 213 may store, in the storage module 220, the type (e.g., a heart rate, a fingerprint, an iris, and a blood pressure) of biometric data that the user selects, and reference biometric data values (e.g., a reference heart rate value, a fingerprint of the user, an iris of the user, and a blood pressure value of the user) for switching to the second communication network in order to originate the emergency call. For example, in the case of a heart rate, the registration module 213 may automatically or manually store, in the storage module 220, a reference heart rate value for switching to the second communication network in order to originate the emergency call. For example, in the case of a fingerprint or an iris, the registration module 213 may store, in the storage module 220, the fingerprint or iris of the user for switching to the second communication network in order to originate the emergency call. For example, in the case of a blood pressure, the registration module 213 may automatically or manually store, in the storage module, a reference blood pressure value for switching to the second communication network in order to originate the emergency call.

According to an embodiment of the present disclosure, when the electronic device 200 is configured to provide a voice service through the first communication network, if the electronic device 200 attempts to originate an emergency call, the identification module 215 may identify whether at least one of conditions for switching to the second communication network satisfies a designated condition. The condition information may include at least one of location information, time information, information for setting a function of switching to the second communication network in order to originate an emergency call, information requesting the origination of an emergency call in a lock-screen state, pattern information for originating an emergency call in a lock-screen state, particular gesture information for originating an emergency call, and biometric data. At least one of conditions may be set for the electronic device 200. Accordingly, when the at least one of conditions is satisfied, the identification module 215 may deliver, to the switching module 217, information notifying of switching to the second communication network in order to originate an emergency call.

According to an embodiment of the present disclosure, when condition information for switching to the second communication network in order to originate an emergency call is set, for the electronic device 200, as location information, the identification module 215 may identify current location information of the electronic device 200, and may detect, in the storage module 220, the location information for switching to the second communication network in order to originate the emergency call. When the current location information of the electronic device 200 is included in the detected location information for switching to the second communication network, the identification module 215 may identify that the condition information for switching to the second communication network satisfies a designated condition, and may deliver, to the switching module 217, information notifying of switching to the second communication network.

According to an embodiment of the present disclosure, when condition information for switching to the second communication network in order to originate an emergency call is set, for the electronic device 200, as time information, the identification module 215 may identify current time, and may detect, in the storage module 220, the time information for switching to the second communication network in order to originate the emergency call. When the current time information is included in the detected time information for switching to the second communication network, the identification module 215 may identify that the condition information for switching to the second communication network satisfies a designated condition, and may deliver, to the switching module 217, information notifying of switching to the second communication network.

According to an embodiment of the present disclosure, when condition information for switching to the second communication network in order to originate an emergency call is preset, for the electronic device 200, as a function of switching to the second communication network in order to originate an emergency call, the identification module 215 may identify that the condition information for switching to the second communication network satisfies a designated condition, and may deliver, to the switching module 217, information notifying of switching to the second communication network.

According to an embodiment of the present disclosure, when condition information for switching to the second communication network in order to originate an emergency call is set as the origination of an emergency call in a lock-screen state, if the electronic device 200 attempts to originate the emergency call in the lock-screen state, the identification module 215 may identify that the condition information for switching to the second communication network satisfies a designated condition, and may deliver, to the switching module 217, information notifying of switching to the second communication network.

According to an embodiment of the present disclosure, when condition information for switching to the second communication network in order to originate an emergency call is set as the input of a pattern in a lock-screen state, if a pattern is input in the lock-screen state of the electronic device 200, the identification module 215 may compare the input pattern with a pattern for originating an emergency call which is stored in the storage module 220. When the input pattern coincides with the pattern for originating the emergency call, the identification module 215 may identify that the condition information for switching to the second communication network satisfies a designated condition, and may deliver, to the switching module 217, information notifying of switching to the second communication network.

According to an embodiment of the present disclosure, when condition information for switching to the second communication network in order to originate an emergency call is set as a gesture, if the identification module 215 identifies that a gesture received by the camera module coincides with a particular gesture for originating an emergency call which is stored in the storage module 220, the identification module 215 may identify that the condition information for switching to the second communication network satisfies a designated condition, and may deliver, to the switching module 217, information notifying of switching to the second communication network.

According to an embodiment of the present disclosure, when condition information for switching to the second communication network in order to originate an emergency call is biometric data, the identification module 215 may compare current biometric data (e.g., a heart rate, a fingerprint, an iris, a blood pressure, etc.) of the user with reference biometric data values (e.g., a reference heart rate value, a fingerprint of the user, an iris of the user, a blood pressure value of the user, etc.) for switching to the second communication network in order to originate an emergency call which are detected in the storage module 220, and thereby may identify whether the condition information for switching to the second communication network satisfies a designated condition. When a current heart rate value of the user received from, for example, a heart rate measurement unit (not illustrated) is greater than or equal to a reference heart rate value, or when fingerprint information received from a fingerprint sensor (not illustrated) or iris information received from an iris sensor (not illustrated) coincides with pre-stored fingerprint information of the user or pre-stored iris information of the user, or when a current blood pressure value of the user received from a blood pressure measurement unit (not illustrated) is greater than or equal to a reference blood pressure value, the identification module 215 may identify that the condition information for switching to the second communication network satisfies a designated condition, and may deliver, to the switching module 217, information notifying of switching to the second communication network. The heart rate measurement unit, the fingerprint sensor, the iris sensor, or the blood pressure measurement unit may be included in the electronic device 102 or 104 illustrated in FIG. 1, and each of the electronic devices 100 and 200 may receive a heart rate value, fingerprint information, iris information, or a blood pressure value from the electronic device 102 or 104.

According to an embodiment of the present disclosure, when the switching module 217 receives the information notifying of switching to the second communication network from the identification module 215, the switching module 217 may switch from the first communication network to the second communication network, and may attempt to originate an emergency call through the second communication network. After requesting the origination of the emergency call, when the switching module 217 receives information notifying of an attempt to originate an emergency call through the first communication network from the identification module 215, or when the switching module 217 does not receive the information notifying of switching to the second communication network from the identification module 215 during a predetermined time period, the switching module 217 may attempt to originate an emergency call through the first communication network. When the switching module 217 receives the information notifying of switching to the second communication network from the identification module 215 while the switching module 217 attempts to originate the emergency call through the first communication network, the switching module 217 may terminate the attempt to originate the emergency call through the first communication network, may switch to the second communication network, and may attempt to originate an emergency call through the second communication network.

The storage module 220 may be, for example, the memory 130 illustrated in FIG. 1. According to an embodiment of the present disclosure, the storage module 220 may store location information for switching to the second communication network in order to originate an emergency call, time information for switching to the second communication network in order to originate an emergency call, pattern information for originating an emergency call in a lock-screen state, particular gesture information for switching to the second communication network in order to originate an emergency call, and biometric data for switching to the second communication network in order to originate an emergency call.

According to various embodiments of the present disclosure, with regard to the electronic device 200, the first communication network is a PS network, and may include an LTE network. The second communication network is a CS network, and may include a 3G network. Alternatively, with regard to the electronic device 200, the first communication network is the CS network, and may include the 3G network. The second communication network is the PS network, and may include the LTE network.

According to various embodiments of the present disclosure, when the origination of an emergency call is requested in a state of a setting of providing a voice service through the first communication network, the identification module 215 may determine whether at least one of conditions for switching to the second communication network is satisfied. When the at least one of conditions for switching to the second communication network satisfies the designated condition, the switching module 217 may be configured to switch to the second communication network and to attempt to originate an emergency call through the second communication network.

According to various embodiments of the present disclosure, the first communication network may include a PS network, and the second communication network may include a CS network.

According to various embodiments of the present disclosure, when current location information or current time information of the electronic device 200 is included in location information or time information for switching to the second communication network, the identification module 215 may be configured to identify that a designated condition is satisfied.

According to various embodiments of the present disclosure, when switching to the second communication network in order to originate an emergency call is preset for the electronic device 200, the identification module 215 may be configured to identify that a designated condition is satisfied.

According to various embodiments of the present disclosure, when the origination of an emergency call is requested in a lock-screen state of the electronic device 200, the identification module 215 may be configured to identify that a designated condition is satisfied.

According to various embodiments of the present disclosure, when pattern information for originating an emergency call is input in the lock-screen state of the electronic device 200, the identification module 215 may be configured to identify that a designated condition is satisfied.

According to various embodiments of the present disclosure, when a particular gesture for originating an emergency call is identified through the camera module, the identification module 215 may be configured to identify that a designated condition is satisfied.

According to various embodiments of the present disclosure, when current biometric data of the user satisfies biometric data for switching to the second communication network, the identification module 215 may be configured to identify that a designated condition is satisfied.

According to various embodiments of the present disclosure, the storage module 220 may further include a storage unit which stores condition information for switching to the second communication network. The condition information for switching to the second communication network may include at least one of location information, time information, information for setting a function of switching to the second communication network in order to originate an emergency call, pattern information for originating an emergency call in a lock-screen state, particular gesture information for originating an emergency call, and biometric data.

According to various embodiments of the present disclosure, when at least one of conditions for switching to the second communication network does not satisfy a designated condition, the switching module 217 may be configured to attempt to originate an emergency call through the first communication network.

Figure 3:
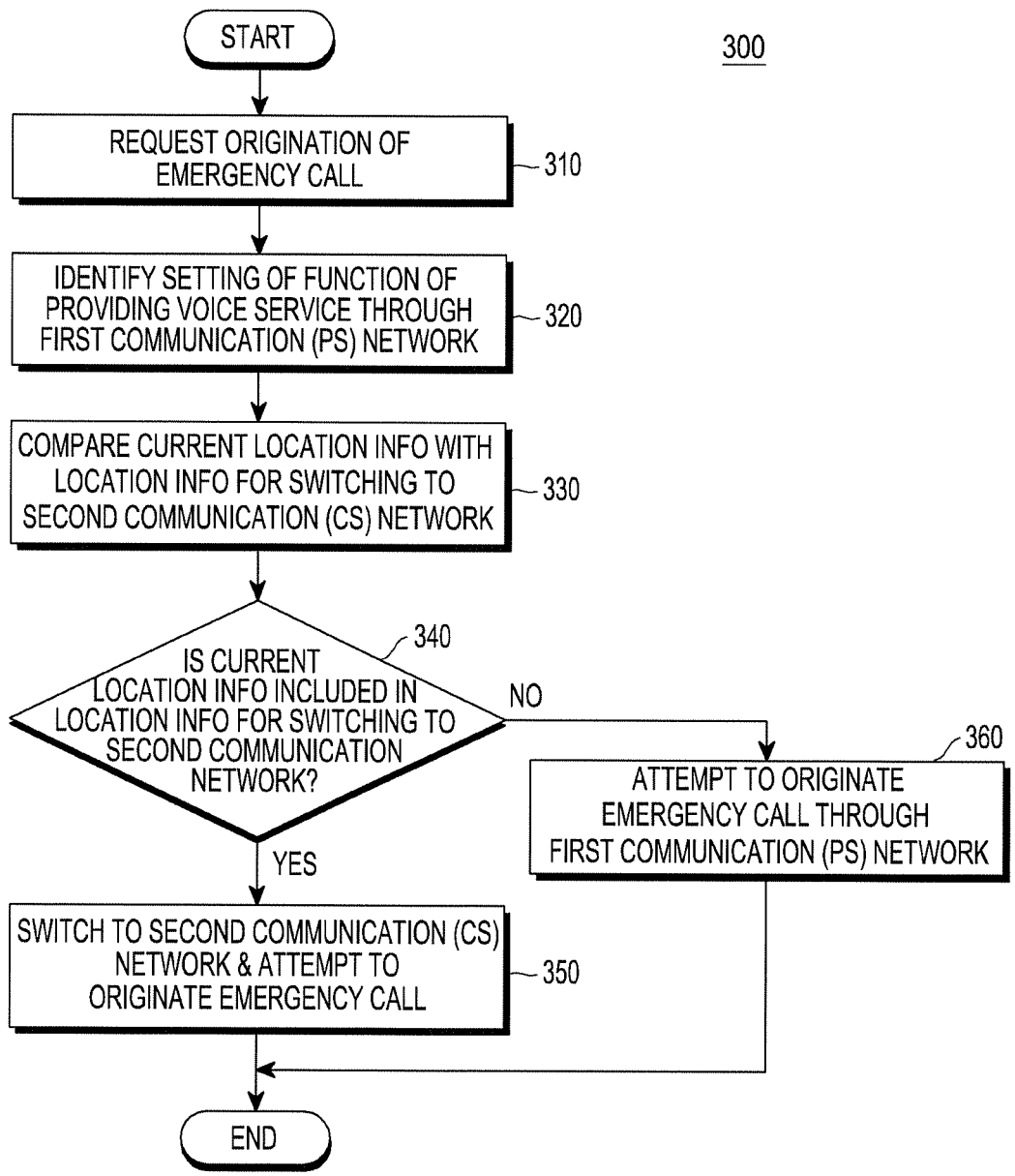
FIG. 3 is a flowchart illustrating a method for controlling an emergency call according to an embodiment of the present disclosure.

FIG. 3 is a flowchart illustrating a method for controlling an emergency call according to an embodiment of the present disclosure. Referring to FIG. 3, the method 300 for controlling an emergency call, according to an embodiment of the present disclosure, includes operation 310 through operation 360. In operation 310, the identification module 215 may receive a request for originating an emergency call. When the request for originating the emergency call has been made in operation 310, in operation 320, the identification module 215 may identify whether the electronic device 200 is configured to provide a voice service through a first communication network (e.g., a PS network). When it is identified in operation 320 that the electronic device 200 is configured to provide a voice service through the first communication network (e.g., a PS network), in operation 330, the identification module 215 may detect current location information of the electronic device 200, and may detect location information for switching to a second communication network (e.g., a CS network) in order to originate an emergency call which is stored in the storage module 220. The identification module 215 may compare the current location information of the electronic device 200 with the detected location information for switching to the second communication network (e.g., a CS network) in order to originate the emergency call. In operation 340, when the current location information of the electronic device 200 coincides with the detected location information for switching to the second communication network (e.g., a CS network) in order to originate the emergency call, the identification module 215 may deliver, to the switching module 217, information notifying of switching to the second communication network in order to originate the emergency call. In operation 350, when the switching module 217 receives, from the identification module 215, the information notifying of switching to the second communication network in order to originate the emergency call, the switching module 217 may switch from the first communication network to the second communication network, and may attempt to originate the emergency call through the second communication network. In operation 340, when the current location information of the electronic device 200 does not coincide with the detected location information for switching to the second communication network (e.g., a CS network) in order to originate the emergency call, the identification module 215 may deliver, to the switching module 217, information notifying of an attempt to originate an emergency call through the first communication network, or may not deliver any information to the switching module 217. In operation 360, when the switching module 217 receives, from the identification module 215, the information notifying of the attempt to originate the emergency call through the first communication network, or when the switching module 217 does not receive any information from the identification module 215 during a predetermined time period, the switching module 217 may attempt to originate the emergency call through the first communication network.

Figure 4:
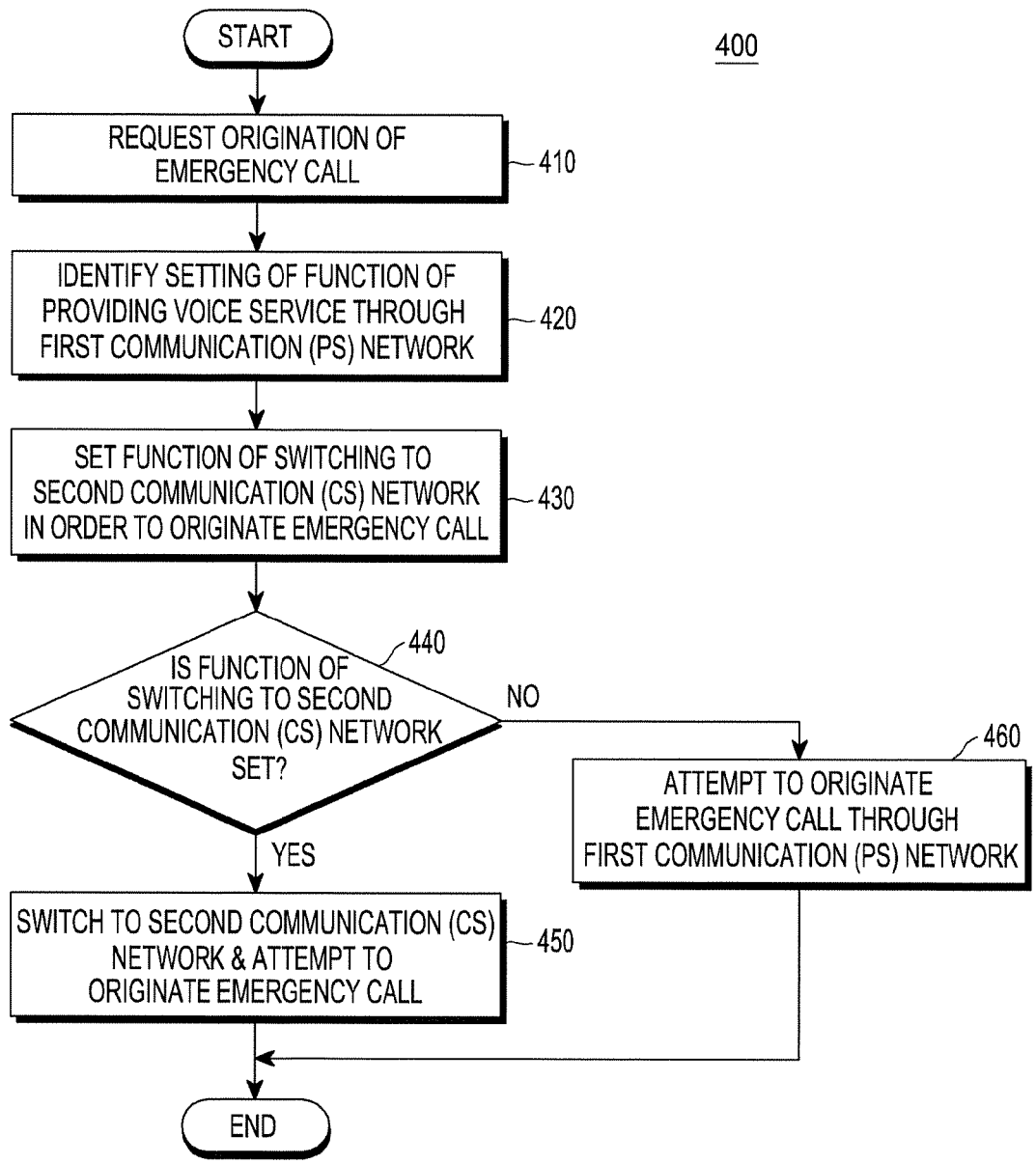
FIG. 4 is a flowchart illustrating a method for controlling an emergency call according to another embodiment of the present disclosure.

FIG. 4 is a flowchart illustrating a method for controlling an emergency call according to another embodiment of the present disclosure. Referring to FIG. 4, the method 400 for controlling an emergency call, according to another embodiment of the present disclosure, includes operation 410 through operation 460. In operation 410, the identification module 215 may receive a request for originating an emergency call. When the request for originating the emergency call has been made in operation 410, in operation 420, the identification module 215 may identify whether the electronic device 200 is configured to provide a voice service through a first communication network (e.g., a PS network). When it is identified in operation 420 that the electronic device 200 is configured to provide a voice service through the first communication network (e.g., a PS network), in operation 430, the identification module 215 may identify whether a function of switching to a second communication network in order to originate an emergency call is preset for the electronic device 200. In operation 440, when it is identified in operation 430 that the function of switching to the second communication network in order to originate the emergency call is preset for the electronic device 200, the identification module 215 may deliver, to the switching module 217, information notifying of switching to the second communication network in order to originate the emergency call. In operation 450, when the switching module 217 receives, from the identification module 215, the information notifying of switching to the second communication network in order to originate the emergency call, the switching module 217 may switch from the first communication network to the second communication network, and may attempt to originate the emergency call through the second communication network. In operation 440, when it is identified in operation 430 that the function of switching to the second communication network in order to originate the emergency call is not preset for the electronic device 200, the identification module 215 may deliver, to the switching module 217, information notifying of an attempt to originate an emergency call through the first communication network, or may not deliver any information to the switching module 217. In operation 460, when the switching module 217 receives, from the identification module 215, the information notifying of the attempt to originate the emergency call through the first communication network, or when the switching module 217 does not receive any information from the identification module 215 during a predetermined time period, the switching module 217 may attempt to originate the emergency call through the first communication network.

Figure 5:
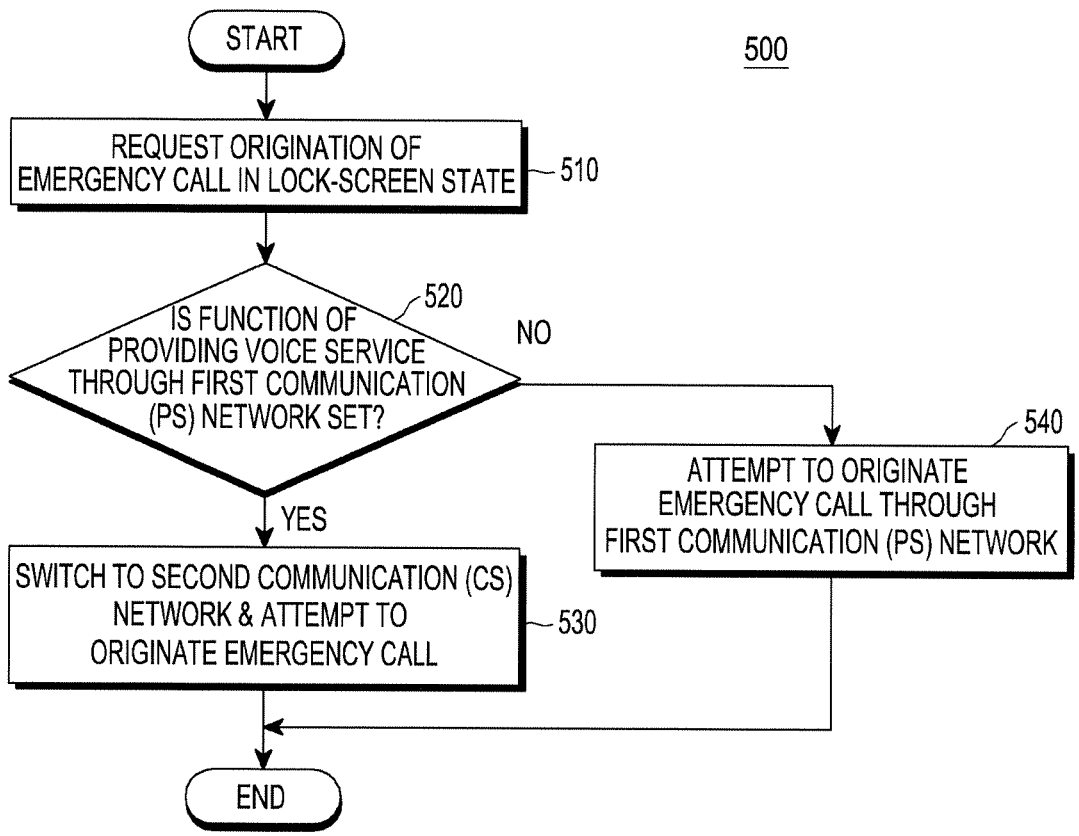
FIG. 5 is a flowchart illustrating a method for controlling an emergency call according to still another embodiment of the present disclosure.

FIG. 5 is a flowchart illustrating a method for controlling an emergency call according to still another embodiment of the present disclosure. Referring to FIG. 5, the method 500 for controlling an emergency call, according to still another embodiment of the present disclosure, includes operation 510 through operation 540. In operation 510, the identification module 215 may receive a request for originating an emergency call in a lock-screen state of the electronic device 200. When the request for originating the emergency call has been made in the lock-screen state of the electronic device 200 in operation 510, in operation 520, the identification module 215 may determine whether the electronic device 200 is configured to provide a voice service through a first communication network (e.g., a PS network). When it is determined in operation 520 that the electronic device 200 is configured to provide a voice service through the first communication network (e.g., a PS network), the identification module 215 may deliver, to the switching module 217, information notifying of switching to a second communication network in order to originate an emergency call. In operation 530, when the switching module 217 receives, from the identification module 215, the information notifying of switching to the second communication network in order to originate the emergency call, the switching module 217 may switch from the first communication network to the second communication network, and may attempt to originate the emergency call through the second communication network. When it is determined in operation 520 that the electronic device 200 is not configured to provide a voice service through the first communication network (e.g., a PS network), the identification module 215 may deliver, to the switching module 217, information notifying of an attempt to originate an emergency call through the first communication network, or may not deliver any information to the switching module 217. In operation 540, when the switching module 217 receives, from the identification module 215, the information notifying of the attempt to originate the emergency call through the first communication network, or when the switching module 217 does not receive any information from the identification module 215 during a predetermined time period, the switching module 217 may attempt to originate the emergency call through the first communication network.

Figure 6:
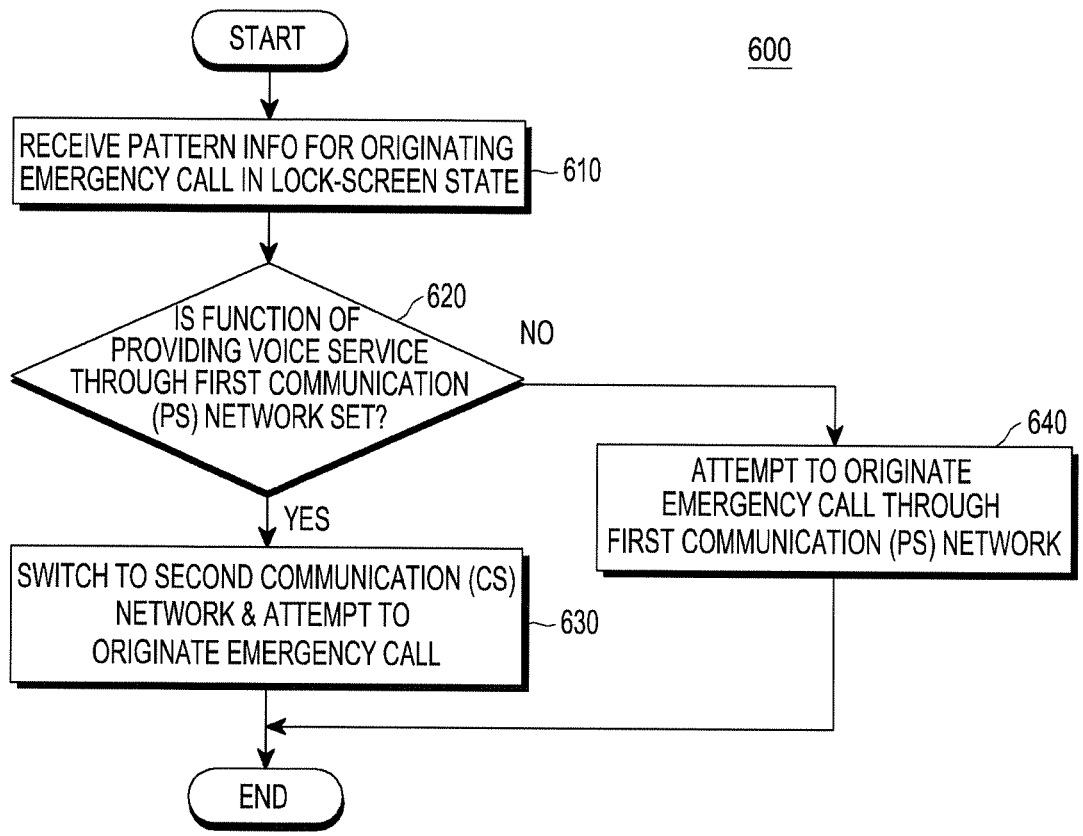
FIG. 6 is a flowchart illustrating a method for controlling an emergency call according to yet another embodiment of the present disclosure.

FIG. 6 is a flowchart illustrating a method for controlling an emergency call according to yet another embodiment of the present disclosure. Referring to FIG. 6, the method 600 for controlling an emergency call, according to yet another embodiment of the present disclosure, includes operation 610 through operation 640. In operation 610, the identification module 215 may receive pattern information that the user inputs in order to request the origination of an emergency call in a lock-screen state of the electronic device 200. When the identification module 215 has received the pattern information for originating the emergency call in the lock-screen state of the electronic device 200 in operation 610, in operation 620, the identification module 215 may determine whether the electronic device 200 is configured to provide a voice service through a first communication network (e.g., a PS network). When it is determined in operation 620 that the electronic device 200 is configured to provide a voice service through the first communication network (e.g., a PS network), the identification module 215 may deliver, to the switching module 217, information notifying of switching to a second communication network in order to originate an emergency call. In operation 630, when the switching module 217 receives, from the identification module 215, the information notifying of switching to the second communication network in order to originate the emergency call, the switching module 217 may switch from the first communication network to the second communication network, and may attempt to originate the emergency call through the second communication network. When it is determined in operation 620 that the electronic device 200 is not configured to provide a voice service through the first communication network (e.g., a PS network), the identification module 215 may deliver, to the switching module 217, information notifying of an attempt to originate an emergency call through the first communication network, or may not deliver any information to the switching module 217. In operation 640, when the switching module 217 receives, from the identification module 215, the information notifying of the attempt to originate the emergency call through the first communication network, or when the switching module 217 does not receive any information from the identification module 215 during a predetermined time period, the switching module 217 may attempt to originate the emergency call through the first communication network.

Figure 7:
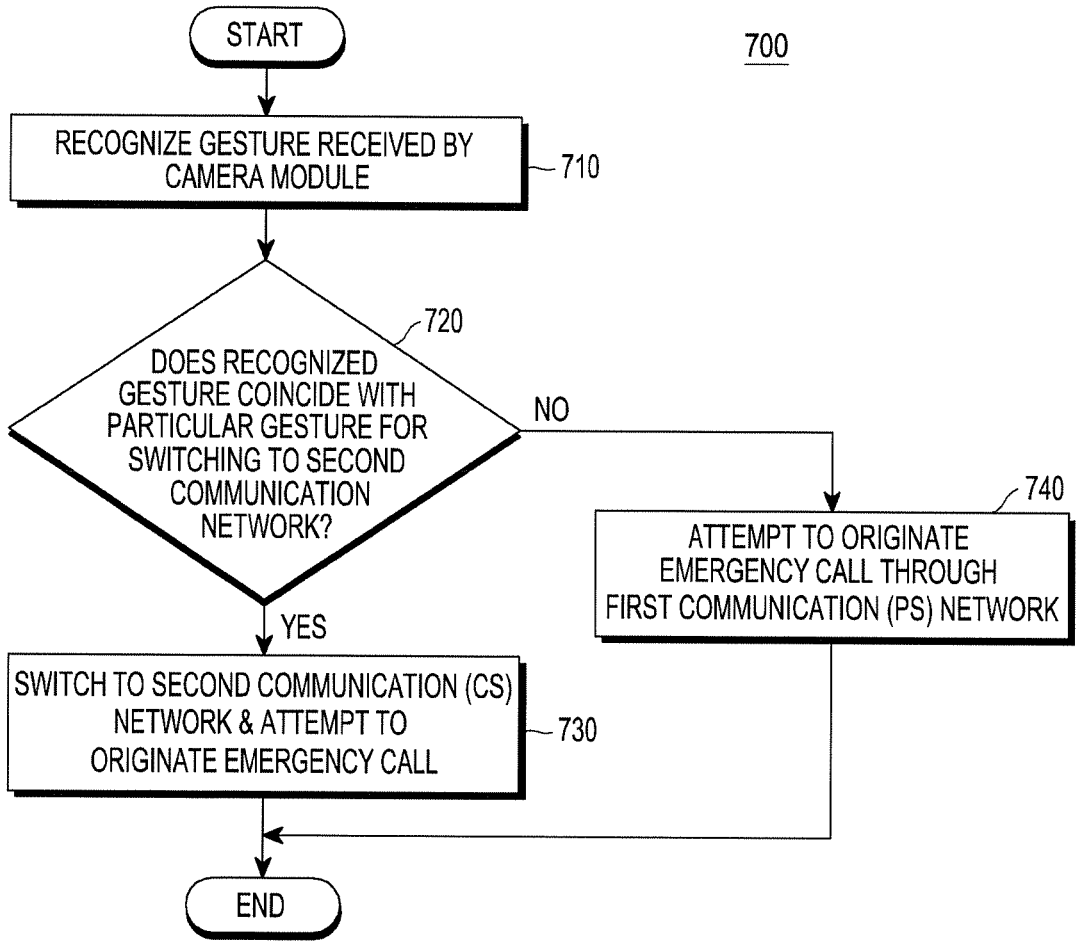
FIG. 7 is a flowchart illustrating a method for controlling an emergency call according to still yet another embodiment of the present disclosure.

FIG. 7 is a flowchart illustrating a method for controlling an emergency call according to still yet another embodiment of the present disclosure. Referring to FIG. 7, the method 700 for controlling an emergency call, according to still yet another embodiment of the present disclosure, includes operation 710 through operation 740. In operation 710, the identification module 215 may recognize a gesture received by the driven camera module. In operation 720, the identification module 215 may determine whether the gesture received by the camera module coincides with a particular gesture for switching to a second communication network in order to originate an emergency call which is stored in the storage module 220. When it is determined in operation 720 that the gesture received by the camera module coincides with the particular gesture stored in the storage module 220, the identification module 215 may deliver, to the switching module 217, information notifying of switching to the second communication network in order to originate the emergency call. In operation 730, when the switching module 217 receives, from the identification module 215, the information notifying of switching to the second communication network in order to originate the emergency call, the switching module 217 may switch from the first communication network to the second communication network, and may attempt to originate the emergency call through the second communication network. When it is determined in operation 720 that the gesture received by the camera module does not coincide with the particular gesture stored in the storage module 220, the identification module 215 may deliver, to the switching module 217, information notifying of an attempt to originate an emergency call through the first communication network, or may not deliver any information to the switching module 217. In operation 740, when the switching module 217 receives, from the identification module 215, the information notifying of the attempt to originate the emergency call through the first communication network, or when the switching module 217 does not receive any information from the identification module 215 during a predetermined time period, the switching module 217 may attempt to originate the emergency call through the first communication network.

Figure 8:
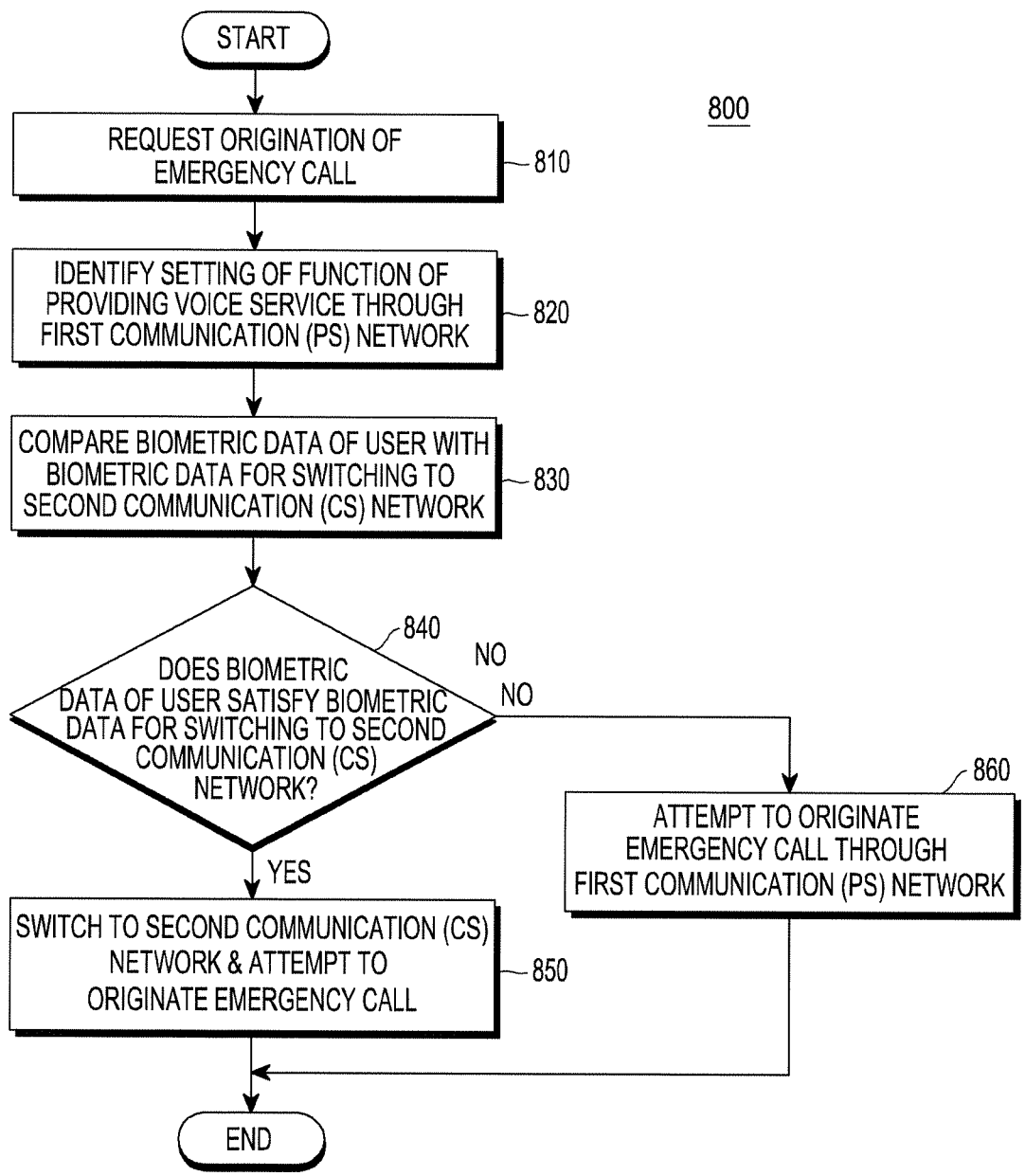
FIG. 8 is a flowchart illustrating a method for controlling an emergency call according to further another embodiment of the present disclosure.

FIG. 8 is a flowchart illustrating a method for controlling an emergency call according to further another embodiment of the present disclosure. Referring to FIG. 8, the method 800 for controlling an emergency call, according to further another embodiment of the present disclosure, includes operation 810 through operation 860. In operation 810, the identification module 215 may receive a request for originating an emergency call. When the request for originating the emergency call has been made in operation 810, in operation 820, the identification module 215 may identify whether the electronic device 200 is configured to provide a voice service through a first communication network (e.g., a PS network). When it is identified in operation 820 that the electronic device 200 is configured to provide a voice service through the first communication network (e.g., a PS network), in operation 830, the identification module 215 may compare the detected current biometric data of the user with biometric data for switching to a second communication network in order to originate an emergency call which is stored in the storage module 220. In operation 840, when the identification module 215 determines that the detected current biometric data of the user satisfies the biometric data stored in the storage module 220, the identification module 215 may deliver, to the switching module 217, information notifying of switching to the second communication network in order to originate the emergency call. In operation 850, when the switching module 217 receives, from the identification module 215, the information notifying of switching to the second communication network in order to originate the emergency call, the switching module 217 may switch from the first communication network to the second communication network, and may attempt to originate the emergency call through the second communication network. When it is determined in operation 840 that the detected current biometric data of the user does not satisfy the biometric data stored in the storage module 220, the identification module 215 may deliver, to the switching module 217, information notifying of an attempt to originate an emergency call through the first communication network, or may not deliver any information to the switching module 217. In operation 860, when the switching module 217 receives, from the identification module 215, the information notifying of the attempt to originate the emergency call through the first communication network, or when the switching module 217 does not receive any information from the identification module 215 during a predetermined time period, the switching module 217 may attempt to originate the emergency call through the first communication network. For example, when a heart rate value of the user is set as biometric data, if a current heart rate value of the user is greater than or equal to a reference heart rate value for switching to the second communication network in order to originate an emergency call, the identification module 215 may deliver, to the switching module 217, information notifying of switching to the second communication network in order to originate the emergency call. For example, when a fingerprint or an iris of the user is set as biometric data, if the received fingerprint information or the received iris information coincides with fingerprint information or iris information for switching to the second communication network in order to originate an emergency call, the identification module 215 may deliver, to the switching module 217, information notifying of switching to the second communication network in order to originate the emergency call. For example, when a blood pressure value of the user is set as biometric data, if a current blood pressure value of the user is greater than or equal to a reference blood pressure value for switching to the second communication network in order to originate an emergency call, the identification module 215 may deliver, to the switching module 217, information notifying of switching to the second communication network in order to originate the emergency call. According to various embodiments of the present disclosure, one biometric datum or a combination of more biometric data may be set as biometric data for switching to the second communication network in order to attempt to originate an emergency call. For example, a heart rate value and fingerprint information may be set as biometric data, or a heart rate value, fingerprint information and iris information may be set as biometric data.

According to various embodiments of the present disclosure, the method for controlling an emergency call in the electronic device may include determining whether at least one of conditions for switching to a second communication network satisfies a designated condition, when a request for originating the emergency call is made in a state of a setting of providing a voice service through a first communication network; and switching to the second communication network and attempting to originate the emergency call, when the at least one of conditions for switching to the second communication network satisfies the designated condition.

According to various embodiments of the present disclosure, the first communication network may include a PS network, and the second communication network may include a CS network.

According to various embodiments of the present disclosure, the determining of whether the at least one of conditions for switching to the second communication network satisfies the designated condition may include identifying that the designated condition is satisfied when current location information or current time information of the electronic device is included in location information or time information for switching to the second communication network.

According to various embodiments of the present disclosure, the determining of whether the at least one piece of condition information for switching to the second communication network satisfies the designated condition may include identifying that the designated condition is satisfied when switching to the second communication network in order to originate the emergency call is set for the electronic device.

According to various embodiments of the present disclosure, the determining of whether the at least one of conditions for switching to the second communication network satisfies the designated condition may include identifying that the designated condition is satisfied when the request for originating the emergency call is made in a lock-screen state of the electronic device.

According to various embodiments of the present disclosure, the determining of whether the at least one piece of condition information for switching to the second communication network satisfies the designated condition may include identifying that the designated condition is satisfied when pattern information for originating an emergency call is input in a lock-screen state of the electronic device.

According to various embodiments of the present disclosure, the determining of whether the at least one of conditions for switching to the second communication network satisfies the designated condition may include identifying that the designated condition is satisfied when a particular gesture for originating an emergency call is identified through a camera module.

According to various embodiments of the present disclosure, the determining of whether the at least one piece of condition information for switching to the second communication network satisfies the designated condition may include identifying that the designated condition is satisfied when current biometric data of a user satisfies biometric data for switching to the second communication network.

According to various embodiments of the present disclosure, the condition information for switching to the second communication network may include at least one of location information, time information, information for setting a function of switching to the second communication network in order to originate an emergency call, pattern information for originating an emergency call in a lock-screen state, particular gesture information for originating an emergency call, and biometric data.

According to various embodiments of the present disclosure, the switching to the second communication network may include attempting to originate the emergency call through the first communication network when at least one of conditions for switching to the second communication network does not satisfy a designated condition.

Figure 9:
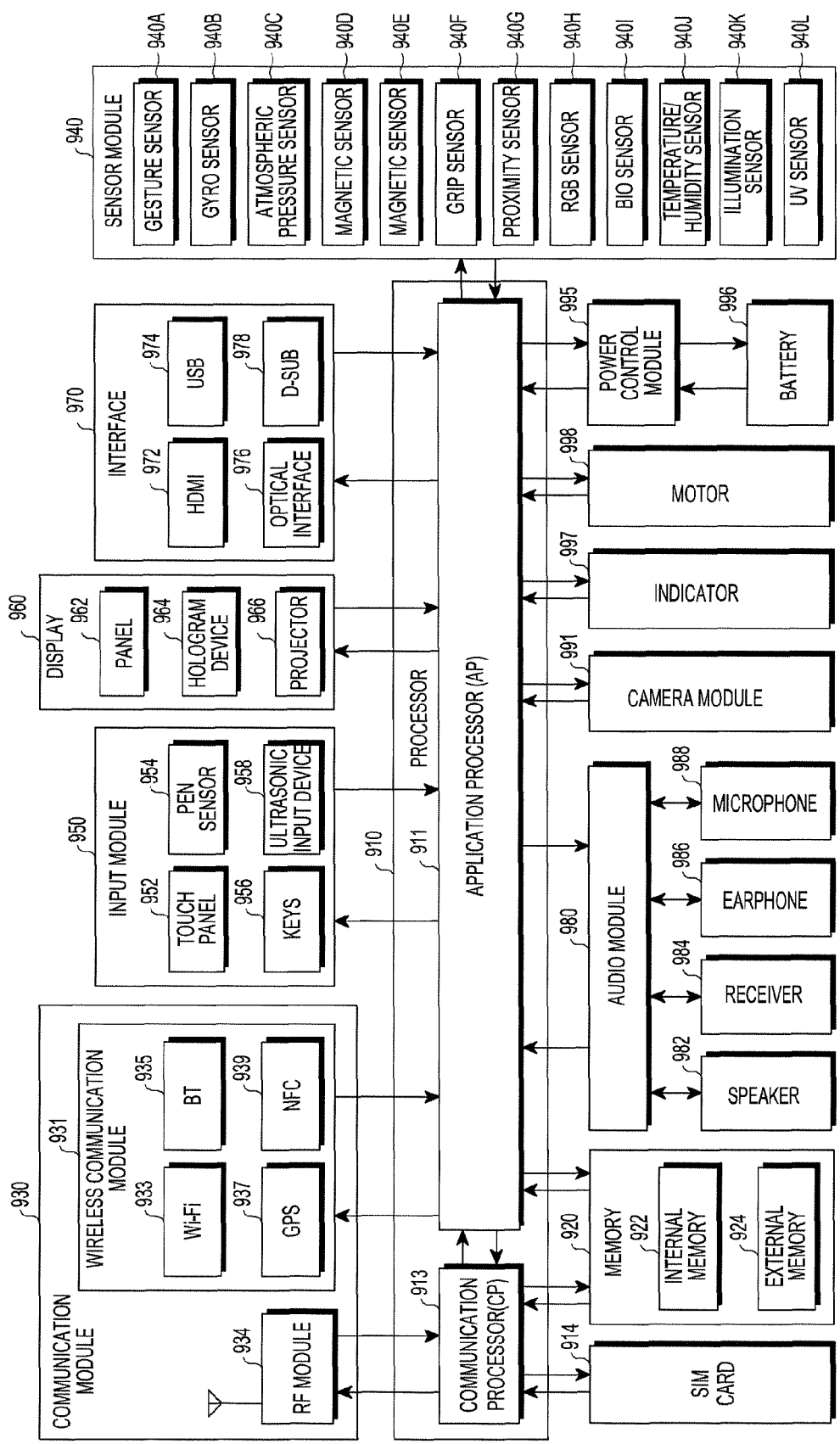
FIG. 9 is a block diagram illustrating a configuration of an electronic device according to various embodiments of the present disclosure.

FIG. 9 is a block diagram illustrating a configuration of an electronic device 900 according to various embodiments of the present disclosure. The electronic device 900 may implement, for example, the whole or part of the electronic device 100 illustrated in FIG. 1. Referring to FIG. 9, the electronic device 900 may include one or more processors 910, a Subscriber Identity Module (SIM) card 914, a memory 920, a communication module 930, a sensor module 940, an input module 950, a display 960, an interface 970, an audio module 980, a camera module 991, a power management module 995, a battery 996, an indicator 997, and a motor 998.

The processor 910 may include one or more Application Processors (APs) 911 or one or more Communication Processors (CPs) 913. The processor 910 may be, for example, the processor 120 illustrated in FIG. 1. In FIG. 9, the AP 911 and the CP 913 are illustrated as being included in the processor 910. However, the AP 911 and the CP 913 may be included in different Integrated Circuit (IC) packages, respectively. According to an embodiment of the present disclosure, the AP 911 and the CP 913 may be included in one IC package.

The AP 911 may control a plurality of hardware or software components connected to the AP 911 by executing an operating system or an application program, and may perform processing of and arithmetic operations on various data including multimedia data. The AP 911 may be implemented as, for example, a System on Chip (SoC). According to an embodiment of the present disclosure, the processor 910 may further include a Graphics Processing Unit (GPU) (not illustrated).

The CP 913 may manage a data link and may convert between communication protocols, in communication between the electronic device 900 and another electronic device connected to the electronic device 900 through a network. The CP 913 may be implemented as, for example, a SoC. According to an embodiment of the present disclosure, the CP 913 may perform at least some of multimedia control functions. The CP 913 may identify and authenticate the electronic device 900 in a communication network by using, for example, a subscriber identity module (e.g., the SIM card 914). Also, the CP 913 may provide the user with services, such as a voice telephone call, a video telephone call, a text message, packet data, and the like.

Further, the CP 913 may control the transmission and reception of data by the communication module 930. In FIG. 9, elements such as the CP 913, the power management module 995, the memory 920, and the like are illustrated as elements separated from the AP 911. However, according to an embodiment of the present disclosure, the AP 911 may be implemented to include at least some (e.g., the CP 913) of the above-described elements.

According to an embodiment of the present disclosure, the AP 911 or the CP 913 may load, into a volatile memory, commands or data received from at least one of a non-volatile memory or other elements which are connected to each of the AP 211 and the CP 213, and may process the commands or data. Also, the AP 911 or the CP 913 may store, in a non-volatile memory, data which has been received from or generated by at least one of other element.

The SIM card 914 may be a card implementing a subscriber identity module, and may be inserted into a slot formed in a particular portion of the electronic device 900. The SIM card 914 may include unique identification information (e.g., an Integrated Circuit Card IDentifier (ICCID)) or subscriber information (e.g., International Mobile Subscriber Identity (IMSI)).

The memory 920 may include an internal memory 922 and an external memory 924. The memory 920 may be, for example, the memory 130 illustrated in FIG. 1. The internal memory 922 may include, for example, at least one of a volatile memory (e.g., a Dynamic Random Access Memory (DRAM), a Static RAM (SRAM), a Synchronous DRAM (SDRAM), etc.) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, etc.). According to an embodiment of the present disclosure, the internal memory 922 may be a Solid State Drive (SSD). The external memory 924 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 924 may be functionally connected to the electronic device 900 through various interfaces.

Although not illustrated, the electronic device 900 may further include a storage apparatus (or a storage medium), such as a hard drive device.

The communication module 930 may include a wireless communication module 931 or a Radio Frequency (RF) module 934. The communication module 930 may be included in, for example, the communication module 160 illustrated in FIG. 1. The wireless communication module 931 may include, for example, Wi-Fi 933, Bluetooth (BT) 935, a Global Positioning System (GPS) 937, or a Near Field Communication (NFC) 939. For example, the wireless communication module 931 may provide a wireless communication function using a radio frequency. Additionally or alternatively, the wireless communication module 931 may include a network interface (e.g., a LAN card), a modem, or the like for connecting the electronic device 900 to a network (e.g., the Internet, a Local Area Network (LAN), a Wide Area Network (WAN), a telecommunication network, a cellular network, a satellite network, a Plain Old Telephone Service (POTS), etc.). In some embodiments, the communication module supports both a PS network and a CS network, and has a switch for switching between the PS network and CS network.

The RF module 934 may process transmission and reception of a voice signal or a data signal. The RF module 934, although not illustrated, may include, for example, a transceiver, a Power Amp Module (PAM), a frequency filter, a Low Noise Amplifier (LNA), or the like. Also, the RF module 934 may further include a component (e.g., a conductor, a conductive wire, etc.) for transmitting and receiving electromagnetic waves in a free space in wireless communication.

The sensor module 940 may include at least one of, for example, a gesture sensor 940A, a gyro sensor 940B, an atmospheric pressure sensor 940C, a magnetic sensor 940D, an acceleration sensor 940E, a grip sensor 940F, a proximity sensor 940G, a Red-Green-Blue (RGB) sensor 940H, a biometric sensor 940I, a temperature/humidity sensor 940J, an illuminance sensor 940K, an Ultraviolet (UV) sensor 940M, and an Infrared (IR) sensor (not illustrated). The sensor module 940 may measure physical quantities or sense an operation state of the electronic device, and may convert the measured or sensed information into an electric signal. Additionally or alternatively, the sensor module 940 may include, for example, an E-nose sensor (not illustrated), an Electromyography (EMG) sensor (not illustrated), an Electroencephalogram (EEG) sensor (not illustrated), an Electrocardiogram (ECG) sensor (not illustrated), a fingerprint sensor, and the like. The sensor module 940 may further include a control circuit for controlling one or more sensors included therein.

The input module 950 may include a touch panel 952, a (digital) pen sensor 954, a key 956, or an ultrasonic input unit 958. The input module 950 may be included in, for example, the input/output interface 140 illustrated in FIG. 1. The touch panel 952 may be of at least one of, for example, a capacitive type, a resistive type, an infrared type, and an acoustic wave type, and may detect a touch input. Also, the touch panel 952 may further include a controller (not illustrated). A capacitive-type touch panel may detect not only physical contact but also proximity. The touch panel 952 may further include a tactile function. In this case, the touch panel 952 may provide a tactile response to the user.

The (digital) pen sensor 954 may be implemented by using, for example, a method identical or similar to a method of receiving a touch input from the user, or a separate sheet for recognition. The key 956 may include, for example, a physical button. Alternatively, the key 956 may include, for example, an optical key, a key pad, or a touch key. The ultrasonic input unit 958 enables a terminal to identify data in such a manner as to detect an acoustic wave by using a microphone (e.g., a microphone 988) through an input means for generating an ultrasonic signal. The ultrasonic input device 258 is capable of wireless recognition. According to an embodiment of the present disclosure, the electronic device 900 may receive a user input from an external device (e.g., a network, a computer, or a server), which is connected to the electronic device 900, through the communication module 930.

The display 960 may include a panel 962, a hologram 964, or a projector 966. The display 960 may be, for example, the display module 150 illustrated in FIG. 1. The panel 962 may be, for example, a Liquid Crystal Display (LCD), an Active Matrix Organic Light Emitting Diode (AMOLED) display, and the like. The panel 962 may be implemented so as to be, for example, flexible, transparent, or wearable. The panel 962 and the touch panel 952 may be integrated into one module. The hologram 964 may display a three-dimensional image in the air by using the interference of light. The projector 966 may display an image on an external screen through the projection of light. According to an embodiment of the present disclosure, the display 960 may further include a control circuit for controlling the panel 962, the hologram 964, or the projector 966.

The interface 970 may include, for example, a High-Definition Multimedia Interface (HDMI) 972, a Universal Serial Bus (USB) 974, an optical communication 976, or a D-subminiature (D-sub) 978. The communication module 930 may be included in, for example, the communication module 160 illustrated in FIG. 1. Additionally or alternatively, the interface 970 may include, for example, a Secure Digital (SD)/Multimedia Card (MMC) (not illustrated) or an Infrared Data Association (IrDA) (not illustrated).

The audio module 980 may bilaterally convert a sound and an electronic signal. The audio module 980 may be included in, for example, the input/output interface 140 illustrated in FIG. 1. The audio module 980 may process sound information which is input or output through, for example, a speaker 982, a receiver 984, an earphone 986, the microphone 988 or the like.

The camera module 991 is an apparatus capable of capturing an image and a moving image. According to an embodiment of the present disclosure, the camera module 991 may include one or more image sensors (e.g., a front-side sensor or a rear-side sensor), a lens, an Image Signal Processor (ISP) (not illustrated), or a flash (not illustrated) (e.g., an LED or a xenon lamp).

The power management module 995 may manage power of the electronic device 900. Although not illustrated, the power management module 995 may include, for example, a Power Management Integrated Circuit (PMIC), a charger Integrated Circuit (IC), or a battery fuel gauge.

The PMIC may be mounted to, for example, an IC or a SoC semiconductor. Charging methods may be classified into a wired charging method and a wireless charging method. The charger IC may charge the battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added.

The battery fuel gauge may measure, for example, a residual quantity of the battery 996, or a voltage, a current or a temperature during the charging. The battery 996 may store electricity, and may supply power. The battery 996 may include, for example, a rechargeable battery or a solar battery.

The indicator 997 may indicate particular states (e.g., a booting state, a message state, a charging state, etc.) of the electronic device 900 or a part (e.g., the AP 911) of the electronic device 900. The motor 998 may convert an electrical signal into a mechanical vibration.

Although not illustrated, the electronic device 900 may include a processing unit (for example, GPU) for mobile TV support. The processing unit for supporting the mobile TV may process, for example, media data according to a standard of a Digital Multimedia Broadcasting (DMB), a Digital Video Broadcasting (DVB), a media flow or the like.

Each of the components of the electronic device according to the present disclosure may be implemented by one or more components and the name of the corresponding component may vary depending on a type of the electronic device. The electronic device according to the present disclosure may include one or more of the aforementioned components or may further include other additional components, or some of the aforementioned components may be omitted. Further, some of the components of the electronic device according to the present disclosure may be combined to be one entity, which may perform the same functions as those of the components before the combination.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present disclosure, in a storage medium which is storing commands, the commands are set to cause at least one processor to perform at least one operation when the commands are executed by the at least one processor. The at least one operation may include determining whether at least one piece of condition information for switching to a second communication network satisfies a designated condition, when a request for originating an emergency call is made in a state of a setting of providing a voice service through a first communication network; and switching to the second communication network and attempting to originate the emergency call, when the at least one of conditions for switching to the second communication network satisfies the designated condition.

The electronic device, according to various embodiments of the present disclosure, may receive and store a program including commands which cause the electronic device to perform the method for originating an emergency call from a program providing apparatus to which the electronic device is connected by wire or wirelessly. The electronic device or the server illustrated in FIG. 1 may be the program providing apparatus. The program providing device may include a memory for storing the program, a communication module to execute wired or wireless communication with an electronic device, and a processor that transmits a corresponding program to the electronic device automatically or in response to the electronic device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
    a communication module configured to support a first communication network and a second communication network, comprising a switch module for switching between the first communication network and the second communication network; and
    a processor configured to:
        determine whether at least one of conditions for switching to a second communication network satisfies a condition, when a request for originating an emergency call is made in a state of a setting for providing a voice service through the first communication network;
        cause the switch module to switch into the second communication network; and
        attempt to originate the emergency call when the at least one of conditions for switching to the second communication network is satisfied;
        wherein the processor is configured to determine that one of the conditions is satisfied when current location information or current time information of the electronic device is included in location information or time information for switching to the second communication network.

2. The electronic device as claimed in claim 1, wherein the first communication network includes a Packet Switched (PS) network, and the second communication network includes a Circuit Switched (CS) network.

3. The electronic device as claimed in claim 1, wherein the processor is further configured to determine that one of the condition is satisfied when switching to the second communication network in order to originate the emergency call is preset for the electronic device.

4. The electronic device as claimed in claim 1, wherein the switching module is configured to attempt to originate the emergency call through the first communication network, when the at least one of conditions for switching to the second communication network does not satisfy the condition.

5. An electronic device comprising:
    a communication module configured to support a first communication network and a second communication network, comprising a switch module for switching between the first communication network and the second communication network; and
    a processor configured to:
        determine whether at least one of the conditions for switching to a second communication network satisfies a condtion, when the request for originating the emergency call is made in a lock-screen state of the electronic device in a state of a setting for providing a voice service through the first communication network
        cause the switch module to switch into the second communication network; and
        attempt to originate the emergency call when the at least one of conditions for switching to the second communication network is satisfied.

6. An electronic device comprising:
    a communication module configured to support a first communication network and a second communication network, comprising a switch module for switching between the first communication network and the second communication network; and
    a processor configured to:
        determine whether at least one of the conditions for switching to a second communication network satisfies a condition, when pattern information for originating the emergency call is input in a lock-screen state of the electronic device in a state of a setting for providing a voice service through the first communication network;
        cause the switch module to switch into the second communication network; and
        attempt to originate the emergency call when the at least one of conditions for switching to the second communication network is satisfied.

7. An electronic device comprising:
    a communication module configured to support a first communication network and a second communication network, comprising a switch module for switching between the first communication network and the second communication network; and
    a processor configured to:
        determine whether at least one of the conditions for switching to a second communication network satisfies a condition, when a particular gesture for originating the emergency call is identified through the camera module in a state of a setting for providing a voice service through the first communication network;
        cause the switch module to switch into the second communication network; and attempt to originate the emergency call when the at least one of conditions for switching to the second communication network is satisfied.

8. An electronic device comprising:
a communication module configured to support a first communication network and a second communication network, comprising a switch module for switching between the first communication network and the second communication network; and
a processor configured to:
determine whether at least one of the conditions for switching to a second communication network satisfies a condition, when current biometric data of a user satisfies biometric data for switching to the second communication network in a state of a setting for providing a voice service through the first communication network;
cause the switch module to switch into the second communication network; and
attempt to originate the emergency call when the at least one of conditions for switching to the second communication network is satisfied.

9. An electronic device comprising:
a communication module configured to support a first communication network and a second communication network, comprising a switch module for switching between the first communication network and the second communication network; and
a processor configured to:
determine whether at least one of the conditions for switching to a second communication network satisfies a condition, when a request for originating an emergency call is made in a state of a setting for providing a voice service through a first communication network;
cause the switch module to switch into the second communication network; and
attempt to originate the emergency call when the at least one of conditions for switching to the second communication network is satisfied.,
wherein the conditions for switching into the second communication network comprises at least one of:
location information;
time information;
information for setting a function of switching to the second communication network in order to originate the emergency call;
pattern information for originating the emergency call in a lock-screen state;
particular gesture information for originating the emergency call; and
biometric data.

10. A method for controlling an emergency call in an electronic device comprising a communication module configured to support a first communication network and a second communication network, comprising a switch module for switching between the first communication network and the second communication network, and a processor, the method comprising:
determining, by the processor, whether at least one of conditions for switching into a second communication network is satisfied when a request for originating an emergency call is made in a state of a setting for providing a voice service through a first communication network; and
switching, by the switch module, into the second communication network; and attempting, by the processor, to originate the emergency call when the at least one of conditions for switching into the second communication network is satisfied,
wherein the determination of whether the at least one of conditions for switching to the second communication network is satisfied comprises identifying that one of the conditions is satisfied when a current location or a current time of the electronic device is within a designated location or time for switching to the second communication network.

11. The method as claimed in claim 10, wherein the first communication network includes a Packet Switched (PS) network, and the second communication network includes a Circuit Switched (CS) network.

12. The method as claimed in claim 10, wherein the determination of whether the at least one of conditions for switching to the second communication network is satisfed comprises determining that one of the designated conditions is satisfied when switching to the second communication network in order to originate the emergency call is set for the electronic device.

13. The method as claimed in claim 10, wherein switching into the second communication network comprises attempting to originate the emergency call through the first communication network when none of conditions for switching into the second communication network is not satisfied.

14. A method for controlling an emergency call in an electronic device comprising communication module configured to support a first communication network and a second communication network, comprising a switch module for switching between the first communication network and the second communication network, and a processor, the method comprising:
determining, by the processor, whether at least one of conditions for switching into the second communication network is satisfied when the request for originating the emergency call is made in a lock-screen state of the electronic device in a state of a setting for providing a voice service through the first communication network; and
switching, by the switch module, into the second communication network; and
attempting, by the processor, to originate the emergency call when the at least one of conditions for switching into the second communication network is satisfied.

15. A method for controlling an emergency call in an electronic device comprising communication module configured to support a first communication network and a second communication network, comprising a switch module for switching between the first communication network and the second communication network, and a processor, the method comprising:
determining, by the processor, whether at least one of conditions for switching into the second communication network is satisfied when pattern information for originating the emergency call is input in a lock-screen state of the electronic device in a state of a setting for providing a voice service through the first communication network; and
switching, by the switch module, into the second communication network; and
attempting, by the processor, to originate the emergency call when the at least one of conditions for switching into the second communication network is satisfied.

16. A method for controlling an emergency call in an electronic device comprising communication module configured to support a first communication network and a second communication network, comprising a switch module for switching between the first communication network and the second communication network, and a processor, the method comprising:
  determining, by the processor, whether at least one of conditions for switching into the second communication network is satisfied when a particular gesture for originating the emergency call is identified through the camera module in a state of a setting for providing a voice service through the first communication network; and
  switching, by the switch module, into the second communication network; and
  attempting, by the processor, to originate the emergency call when the at least one of conditions for switching into the second communication network is satisfied.

17. A method for controlling an emergency call in an electronic device comprising communication module configured to support a first communication network and a second communication network, comprising a switch module for switching between the first communication network and the second communication network, and a processor, the method comprising:
  determining, by the processor, whether at least one of conditions for switching into the second communication network is satisfied when current biometric data of a user satisfies biometric data for switching to the second communication network in a state of a setting for providing a voice service through the first communication network; and
  switching, by the switch module, into the second communication network; and
  attempting, by the processor, to originate the emergency call when the at least one of conditions for switching into the second communication network is satisfied.

18. A method for controlling an emergency call in an electronic device comprising communication module configured to support a first communication network and a second communication network, comprising a switch module for switching between the first communication network and the second communication network, and a processor, the method comprising:
  determining, by the processor, whether at least one of conditions for switching into the second communication network is satisfied when a request for originating an emergency call is made in a state of a setting for providing a voice service through the first communication network; and
  switching, by the switch module, into the second communication network; and
  attempting, by the processor, to originate the emergency call when the at least one of conditions for switching into the second communication network is satisfied,
  wherein the conditions for switching into the second communication network comprises at least one of:
    location information;
    time information;
    information for setting a function of switching to the second communication network in order to originate the emergency call;
    pattern information for originating the emergency call in a lock-screen state;
    particular gesture information for originating the emergency call; and
    biometric data.

19. A non-transitory storage medium configured to store a program that, when executed by one or more processors, causes the one or more processors to:
  determining whether at least one of conditions for switching to a second communication network is satisfied, when a request for originating an emergency call is made in a state of a setting for providing a voice service through a first communication network;
  switching into the second communication network; and
  attempting to originate the emergency call when the at least one of conditions for switching to the second communication network is satisfied;
  wherein the determination of whether the at least one of conditions for switching to the second communication network is satisfied comprises identifying that one of the conditions is satisfied when a current location or a current time of the electronic device is within a designated location or time for switching to the second communication network.

* * * * *